TAPE RECORDER

Filed Aug. 12, 1964

INVENTOR
HYMAN HURVITZ

BY Hurvitz & Rose

ATTORNEYS

United States Patent Office 3,276,707 Patented Oct. 4, 1966

3,276,707

TAPE RECORDER

Hyman Hurvitz, Washington, D.C., assignor of one-third to James N. Cooper, Hyattsville, Md.

Filed Aug. 12, 1964, Ser. No. 389,144
5 Claims. (Cl. 242—55.12)

Figure 1:
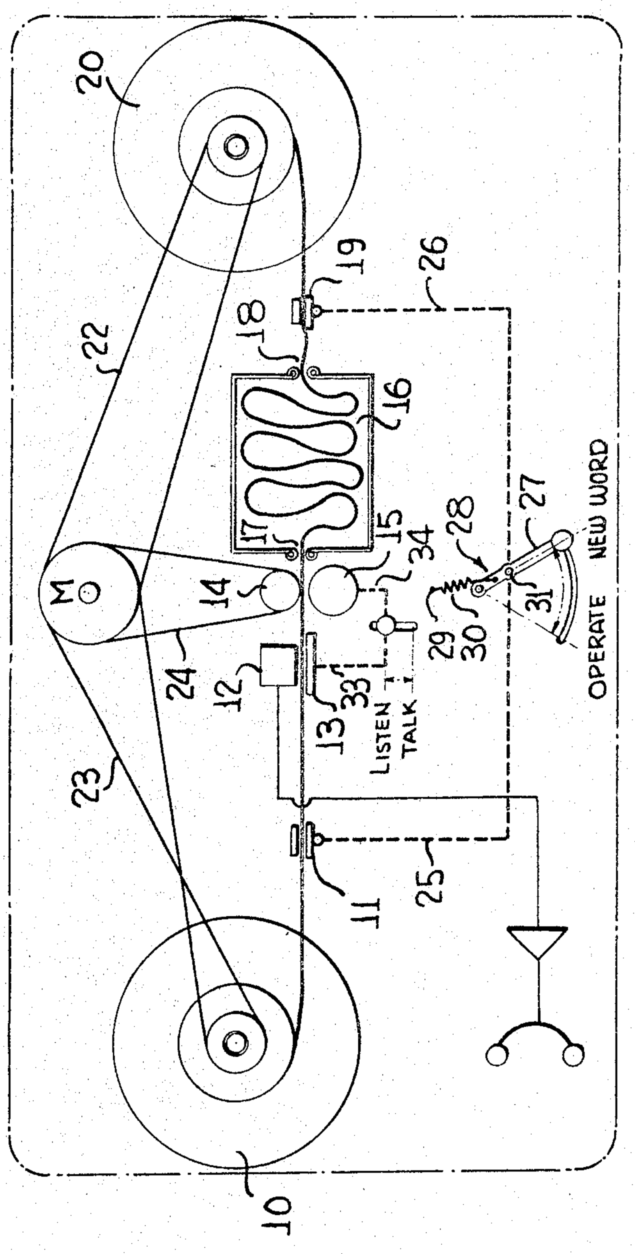

The present invention relates generally to tape recorders, and more particularly, to tape recorders having facility for semi-automatic repetition at will of items of recorded information.

Particularly in the field of language training, recorded items of variable lengths are required to be repeated at will for any desired number of repetitions of each item. Assuming the items are words or phrases, the pupil desires at will to reproduce an item, to recite same, to reproduce again and to recite, and so on until satisfied with his performance in properly repeating the item. As many as ten repetitions may be needed, and the items may have a random duration of anywhere from one-half to ten seconds. It is desirable that each item be recorded only once on the tape, that the reproduction machine be small, light, battery operated, economical of battery power, simple, and of low cost.

According to the present invention, a tape, having recorded thereon items of random lengths (1–10 seconds) separated by spaces (1 second), is wound on a reel which is only lightly frictionally coupled to a drive. When it is desired to reproduce an item, a pinch roller presses the tape against a rotating capstan and pulls the tape past a reproduce head, while pushing the tape into a bin. When the item has been reproduced, the tape is pulled back onto the supply reel from the bin. To accomplish this, the supply reel is constantly driven backward, but since the drive is light and frictional, the driving of the supply reel does not interfere with reproduction. It is only necessary to release the pinch roller and the head pressure pad to accomplish return of the tape to the supply reel, which always occurs to the same starting point since only the length of tape previously fed into the bin can be pulled back onto the supply reel.

To feed a new item into position, the tape adjacent to the supply reel is held while the take-up reel is driven. This is done while the bin contains a taped item, and since only the tape in the bin is removed, the next item is automatically in place to be reproduced when the bin has been emptied.

Only one capstan is required, and only one amplifier. No relays or solenoids are employed. The tape cannot break since all drives are frictional, and since each item is repeated only once a short length of tape suffices for a long lesson, while load on the single motor is minimized. Feed forward and feed back of tape to any place therealong at high speed is readily accomplished, since the tape reels are of great diameter relative to capstan diameter, and the tape can be driven in either direction by the reels, independently of the capstan, merely by placing a weight on the reel to which take-up is desired.

It is, accordingly, an object of the invention to provide a novel tape recorder suitable for language training.

Figure 2:
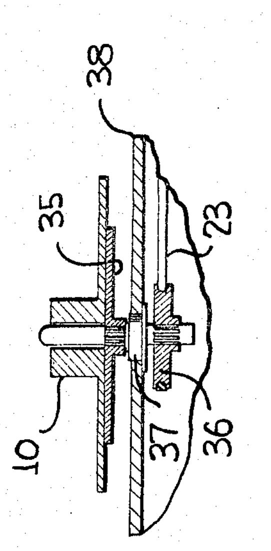

The above and still further objects, features and advantages of the present invention will become apparent upon consideration of the following detailed description of one specific embodiment thereof, especially when taken in conjunction with the accompanying drawings, wherein:

FIGURE 1 is a schematic view in plan of a system according to the invention; and FIGURE 2 is a view in section of a tape drive or take up, employing light frictional coupling.

Referring now to the drawings, 10 is a supply reel containing tape having a series of spaced items of random durations recorded thereon. The tape proceeds past a movable pressure pad or brake 11, a reproduce head 12 and movable pressure pad 13, a capstan 14 and pinch roller 15, a bin 16 having an inlet 17 and an outlet 18, a further movable pressure pad or brake 19, a take-up reel 20. A single motor M is employed, which drives reel 20 continuously in take up relation and reel 10 continuously in reverse relation.

Motor M drives reel 20 via belt 22, reel 10 via belt 23 and capstan 14 via belt 24. Pads 11, 19 are alternately pressed by linkages 25, 26, operated by liner arm 27 and overcenter unit 28. The latter includes a fixed point 29 and a tension spring 30 extending from arm 27 to point 29. Arms 25, 26 are secured pivotally to movable pivot 31 so that spring 30 holds arm 27 in either operated position.

Pinch roller 15 and pad 13 are moved together by arms 33, 34, into engagement or out of engagement.

The reel 10 (as is also true of reel 20) rests on a rotatable platform 35, driven by a spindle 36 which extends through a bearing 37 in support plate 38, and platform 35 drives reel 10 by friction only.

In operation, when one wishes to listen to an item, arm 27 is placed in operate position, i.e. moved to the right. This releases pad 11 and presses pad 19. Reel 20 now holds, since its drive (as 35) slips. On pressing arms 33, 34 inward, pinch roller 14 and pad 13 engage, an item is reproduced and the tape containing the item is fed into bin 16 via inlet 17. On termination of reproduction of the item, arms 33 and 34 are withdrawn and reel 10 immediately and rapidly pulls the tape back to its initial position. The operation can be repeated as often as desired and the initial part of the item will automatically always be in proper position with respect to head 12, following pull back of tape.

When the student has completed the desired number of repetitions of the item, and with the taped item in bin 16, arm 27 is moved to the new word position. Pad 11 now holds the tape adjacent to reel 10 and since nothing holds the tape to the right of pad 11, reel 20 rapidly takes up the tape in the bin. After completion of this operation, the arm 27 is again moved to "operate" position and a new item reproduced.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a tape reproducer including a take-up reel and a supply reel, the combination comprising first means for driving said supply reel only frictionally in tape take-up relation, second means driving said take-up reel only frictionally in tape take-up relation, a capstan, a pinch roller cooperating with said capstan, a readout head, a tape bin located intermediate said readout head and said second means, brake means located between said bin and said take-up reel to prevent movement of tape from said bin onto said take-up reel, said capstan and pinch roller being operative at will to feed tape from said supply reel into said tape bin on engagement of said capstan by said pinch roller, said supply reel operating to pull tape located in said tape bin from said tape bin on release of said pinch roller and operation of said brake means.

2. The combination according to claim 1 wherein said first means is continuously operative frictionally to drive said supply reel for all operative conditions of said pinch roller.

3. The combination according to claim 2 wherein said second means is continuously operative frictionally to drive said take-up reel for all operative conditions of said pinch roller.

4. The combination according to claim 1 wherein is provided a tape brake located between said supply reel and said capstan, said tape brake being operative on release of said brake means to permit movement of said tape from said bin to said take-up reel.

5. In a tape reproducer, a take-up reel, a supply reel, a capstan and pinch-roller, a bin, a first tape brake, a second tape brake, a readout head, arranged in the order supply reel, first tape brake, readout head, capstan and pinch-roller, bin, second tape brake, take-up reel, means rendering said tape brakes only alternatively operative, means including said supply reel for pulling said tape from said bin onto said supply reel while said second tape brake is operative, and means pulling said tape from said bin onto said take up reel while said first tape brake is operative.

References Cited by the Examiner

UNITED STATES PATENTS

| | | | |
|---|---|---|---|
| 2,814,676 | 11/1957 | House | 242—55.12 |
| 3,155,778 | 11/1964 | Meyer | 226—118 X |

FRANK J. COHEN, *Primary Examiner.*

G. F. MAUTZ, *Assistant Examiner.*